(12) United States Patent
Frantz (10) Patent No.: US 10,654,111 B2
(45) Date of Patent: May 19, 2020

(54) CURVATURE FOR PATHWAY OF A LOCATING DEVICE OR CHUCK

(71) Applicant: Walter Forrest Frantz, Sequim, WA (US)

(72) Inventor: Walter Forrest Frantz, Sequim, WA (US)

( * ) Notice: Subject to any disclaimer, the term of this patent is extended or adjusted under 35 U.S.C. 154(b) by 0 days.

(21) Appl. No.: 15/902,148

(22) Filed: Feb. 22, 2018

(65) Prior Publication Data
US 2018/0272437 A1 Sep. 27, 2018

Related U.S. Application Data

(60) Provisional application No. 62/477,317, filed on Mar. 27, 2017.

(51) Int. Cl.
*B23B 31/163* (2006.01)
*B23B 31/16* (2006.01)

(52) U.S. Cl.
CPC .... *B23B 31/16004* (2013.01); *B23B 31/1627* (2013.01); *B23B 2231/32* (2013.01);
(Continued)

(58) Field of Classification Search
CPC .......... B23B 31/16004; B23B 31/1612; B23B 31/1627; B23B 2231/32;
(Continued)

(56) References Cited

U.S. PATENT DOCUMENTS

| 749,794 A * | 1/1904 | Inman | B23B 31/19 |
| | | | 279/114 |
| 1,370,943 A * | 3/1921 | Boyd | B67B 7/34 |
| | | | 279/114 |

(Continued)

FOREIGN PATENT DOCUMENTS

| DE | 202013009347 U1 * | 1/2014 | ....... B23B 31/16004 |
| DE | 102015212379 A1 * | 1/2017 | ............. A61B 17/42 |

(Continued)

OTHER PUBLICATIONS

Machine Translation, German Patent Document, DE 202013009347, Langhans, M., Jan. 2017.*

*Primary Examiner* — Eric A. Gates
*Assistant Examiner* — Chwen-Wei Su
(74) *Attorney, Agent, or Firm* — Wilson Sonsini Goodrich & Rosati (57) ABSTRACT

Disclosed is the shape of a curvature of two or more pathways for a device having moving parts that cause movement of an object along those pathways, such that the device can locate or hold the object. In the embodiment, an apparatus is described that centers and optionally locks an object at a desired location. The applications for such a device are varied and can range from chucking a workpiece of varying diameters in a lathe, to centering a drone on a landing zone, to medical and scientific devices to capture and center objects to study, to moving atomic level objects using an electromagnetic field. The scope of this disclosure is the mathematics that defines the mirrored curvatures of each curved pathway and the positioning of the curvatures relative to each other, and the relative movement of the mirrored curvatures to cause the desired effect.

12 Claims, 6 Drawing Sheets

(52) U.S. Cl.
CPC ... *B23B 2231/46* (2013.01); *B23B 2260/0725* (2013.01); *Y10T 279/1926* (2015.01)

(58) Field of Classification Search
CPC ...... B23B 2260/0725; B23B 31/16008; B23B 31/16012; Y10T 279/1926
See application file for complete search history.

(56) References Cited

U.S. PATENT DOCUMENTS

| | | | |
|---|---|---|---|
| 1,488,221 A * | 3/1924 | Swissgabel | B23B 31/16004 269/104 |
| 2,938,733 A * | 5/1960 | Judelson | B26D 3/16 269/48.1 |
| 3,026,128 A * | 3/1962 | Willis | F16L 23/04 279/114 |
| 3,671,754 A | 6/1972 | Balaji | |
| 5,829,959 A | 11/1998 | Tsubono et al. | |
| 6,053,508 A | 4/2000 | Kuhl | |
| 6,174,150 B1 | 1/2001 | Tsubono et al. | |
| 6,292,992 B1 | 9/2001 | Kuhl | |
| 8,734,066 B2 * | 5/2014 | Rusch | B23B 47/281 279/107 |
| 2002/0150208 A1 | 10/2002 | Yokhin et al. | |
| 2004/0175244 A1 | 9/2004 | Otten | |
| 2007/0006834 A1 | 1/2007 | Schmid | |
| 2018/0045619 A1* | 2/2018 | Kocher | G01N 1/2226 |

FOREIGN PATENT DOCUMENTS

| | | | |
|---|---|---|---|
| GB | 679147 A | 9/1952 | |
| WO | WO-9411710 A1 | 5/1994 | |
| WO | WO-2017001271 A1 | 1/2017 | |

* cited by examiner

FIGURE 5 – Prior Art (Arc) vs Invention (Spiral-Segment) Desired Effect

FIGURE 6

| α | x/-x | y/-y | α | x/-x | y/-y | α | x/-x | y/-y | α | x/-x | y/-y |
|---|---|---|---|---|---|---|---|---|---|---|---|
| 0 | 1000 | 0 | 45 | 1551 | 1551 | 90 | 0 | 4810 | 135 | -7460 | 7460 |
| 1 | 1017 | 18 | 46 | 1550 | 1605 | 91 | -85 | 4894 | 136 | -7723 | 7458 |
| 2 | 1035 | 36 | 47 | 1549 | 1661 | 92 | -174 | 4978 | 137 | -7990 | 7451 |
| 3 | 1052 | 55 | 48 | 1546 | 1718 | 93 | -265 | 5062 | 138 | -8262 | 7439 |
| 4 | 1070 | 75 | 49 | 1543 | 1775 | 94 | -360 | 5146 | 139 | -8539 | 7422 |
| 5 | 1087 | 95 | 50 | 1538 | 1833 | 95 | -457 | 5229 | 140 | -8819 | 7400 |
| 6 | 1104 | 116 | 51 | 1533 | 1893 | 96 | -558 | 5312 | 141 | -9105 | 7373 |
| 7 | 1122 | 138 | 52 | 1526 | 1953 | 97 | -662 | 5395 | 142 | -9394 | 7340 |
| 8 | 1139 | 160 | 53 | 1518 | 2014 | 98 | -770 | 5477 | 143 | -9689 | 7301 |
| 9 | 1156 | 183 | 54 | 1508 | 2076 | 99 | -881 | 5559 | 144 | -9988 | 7256 |
| 10 | 1173 | 207 | 55 | 1498 | 2139 | 100 | -995 | 5641 | 145 | -10291 | 7206 |
| 11 | 1189 | 231 | 56 | 1486 | 2203 | 101 | -1112 | 5722 | 146 | -10598 | 7149 |
| 12 | 1206 | 256 | 57 | 1473 | 2268 | 102 | -1233 | 5802 | 147 | -10910 | 7085 |
| 13 | 1223 | 282 | 58 | 1458 | 2334 | 103 | -1358 | 5881 | 148 | -11226 | 7015 |
| 14 | 1239 | 309 | 59 | 1442 | 2400 | 104 | -1486 | 5960 | 149 | -11547 | 6938 |
| 15 | 1255 | 336 | 60 | 1425 | 2468 | 105 | -1618 | 6037 | 150 | -11872 | 6854 |
| 16 | 1271 | 364 | 61 | 1406 | 2536 | 106 | -1753 | 6114 | 151 | -12201 | 6763 |
| 17 | 1287 | 393 | 62 | 1385 | 2605 | 107 | -1892 | 6189 | 152 | -12534 | 6664 |
| 18 | 1302 | 423 | 63 | 1363 | 2676 | 108 | -2035 | 6264 | 153 | -12871 | 6558 |
| 19 | 1317 | 454 | 64 | 1340 | 2746 | 109 | -2182 | 6337 | 154 | -13212 | 6444 |
| 20 | 1332 | 485 | 65 | 1314 | 2818 | 110 | -2333 | 6409 | 155 | -13557 | 6322 |
| 21 | 1347 | 517 | 66 | 1287 | 2891 | 111 | -2487 | 6479 | 156 | -13906 | 6191 |
| 22 | 1361 | 550 | 67 | 1258 | 2964 | 112 | -2646 | 6548 | 157 | -14258 | 6052 |
| 23 | 1375 | 584 | 68 | 1227 | 3038 | 113 | -2808 | 6615 | 158 | -14615 | 5905 |
| 24 | 1389 | 618 | 69 | 1195 | 3113 | 114 | -2975 | 6681 | 159 | -14974 | 5748 |
| 25 | 1402 | 654 | 70 | 1160 | 3188 | 115 | -3145 | 6745 | 160 | -15338 | 5583 |
| 26 | 1415 | 690 | 71 | 1124 | 3265 | 116 | -3320 | 6807 | 161 | -15705 | 5408 |
| 27 | 1427 | 727 | 72 | 1086 | 3342 | 117 | -3499 | 6866 | 162 | -16075 | 5223 |
| 28 | 1439 | 765 | 73 | 1045 | 3419 | 118 | -3682 | 6924 | 163 | -16448 | 5029 |
| 29 | 1451 | 804 | 74 | 1003 | 3497 | 119 | -3869 | 6979 | 164 | -16824 | 4824 |
| 30 | 1462 | 844 | 75 | 958 | 3576 | 120 | -4060 | 7033 | 165 | -17204 | 4610 |
| 31 | 1472 | 885 | 76 | 911 | 3656 | 121 | -4256 | 7083 | 166 | -17586 | 4385 |
| 32 | 1482 | 926 | 77 | 862 | 3736 | 122 | -4456 | 7131 | 167 | -17971 | 4149 |
| 33 | 1492 | 969 | 78 | 811 | 3816 | 123 | -4661 | 7177 | 168 | -18358 | 3902 |
| 34 | 1501 | 1012 | 79 | 758 | 3897 | 124 | -4869 | 7219 | 169 | -18748 | 3644 |
| 35 | 1509 | 1057 | 80 | 702 | 3979 | 125 | -5082 | 7259 | 170 | -19139 | 3375 |
| 36 | 1516 | 1102 | 81 | 643 | 4061 | 126 | -5300 | 7295 | 171 | -19533 | 3094 |
| 37 | 1523 | 1148 | 82 | 582 | 4143 | 127 | -5522 | 7328 | 172 | -19929 | 2801 |
| 38 | 1530 | 1195 | 83 | 519 | 4226 | 128 | -5749 | 7358 | 173 | -20327 | 2496 |
| 39 | 1535 | 1243 | 84 | 453 | 4308 | 129 | -5980 | 7384 | 174 | -20726 | 2178 |
| 40 | 1540 | 1292 | 85 | 384 | 4392 | 130 | -6215 | 7407 | 175 | -21126 | 1848 |
| 41 | 1544 | 1342 | 86 | 313 | 4475 | 131 | -6455 | 7426 | 176 | -21528 | 1505 |
| 42 | 1547 | 1393 | 87 | 239 | 4559 | 132 | -6700 | 7441 | 177 | -21930 | 1149 |
| 43 | 1549 | 1445 | 88 | 162 | 4643 | 133 | -6949 | 7452 | 178 | -22333 | 780 |
| 44 | 1550 | 1497 | 89 | 83 | 4727 | 134 | -7202 | 7458 | 179 | -22737 | 397 |
|  |  |  |  |  |  |  |  |  | 180 | -23141 | 0 |

CURVATURE FOR PATHWAY OF A LOCATING DEVICE OR CHUCK

BACKGROUND OF THE INVENTION

The market for simple centering mechanisms is large. The most common is a screw-driven type device such as found on a drill to center and clamp a drill bit. Another is on a lathe to chuck small parts. But when attempting to chuck (center and clamp) a workpiece that is large or very small, those types of chucks become bulky, heavy, or not feasible because of the micro-scale. A simple solution that is light weight, easy to handle, scalable to any size, and easy to build (even for holding a large workpiece) for lathe work is called a Longworth Chuck. Its concept is also currently used in the Medical and Aerospace fields. The key issue with the Longworth Chuck is that it is based on a constant curvature arc—a segment of a circle. This limits the size of objects that can be centered on a fixed size chuck and does not provide for a near constant perpendicular force resulting in workpiece chatter, or causing binding or mechanical interference if each slot is too long relative to the size of the chuck.

The Longworth Chuck is made by cutting constant radius slots into two plates. One plate is reversed and then the flat faces of the two plates are put together in an opposing manner such that their origin of their axis align. Clamps are inserted into the slots where the slots intersect at their outermost position in a manner, in some embodiments, that results in a rigid clamp when locked but can slide within the slots as the location of the intersection moves. As one plate is counterrotated relative to the other plate centrically around a center bushing, the clamps are forced inward or outward depending on the relative rotation between the two plates. Thus, the slot of one plate pushes the clamp inward or outward along the slot of the opposing plate. As long as the slot that is pushing against the clamp is fairly perpendicular to the direction that the clamp is supposed to move, the mechanism works well. But when the pushing slot becomes less perpendicular more force is required to move the clamp and the mechanism can jam or decreases the holding-force when locked. To mitigate this issue, the length of each slot is limited in length, which limits the size of the workpiece that can be centered and held. Also, because perpendicularity is not present where the two slots intersect (except at possibly one point) and the intersect angle increases as it moves inward, the slot clamp-up force varies causing workpiece chatter. This limits its application, reliability, and use. The problem is large enough that some machinists avoid use of the Longworth chuck and turn to other more complicated and less versatile chuck methods.

Thus a system that keeps the slots relatively perpendicular was needed to:

Keep the forces to move the clamp inward and outward at a minimum and prevent binding or mechanical interference, especially during the final clamp-up when the clamps engage and hold the workpiece.

Allow centering/holding chucks to be more versatile by being able to center and hold a greater variety of workpiece sizes and shapes.

Greater clamp-up force to hold the workpiece to allow greater holding forces that decrease workpiece chatter, allow faster milling rates, and/or allow deeper cutting depths.

BRIEF SUMMARY OF THE INVENTION

Two mirrored curved shapes were found where the preferred shape is a special spiral-part that can be used to make Pathways (PW) and Mirrored Pathways (MPS) that when counter-rotated around their origin of axis keeps the PW/MPW that Push/Pull Locating-Pins inward or outward perfectly perpendicular to each other to minimize rotational force, prevent binding and mechanical interference, allow for a greater range of movement, and hold a Workpiece more rigidly, thereby allowing improvements in quality, safety, and speed of processing Workpieces.

KEYWORD/PHRASE USAGE AND MEANING IN THIS DOCUMENT

Workpiece—A workpiece or object that is the object of a Push/Pull action.

Push/Pull—An action to pull, attract, push, repulse, move, stop, locate, relocate, position, reposition, center, uncenter, squeeze, relax, hold, release, lock, or unlock or similar actions that result in the relative movement, positioning, or holding of an object caused by Relative-Rotation.

Push/Pull-Force—The force from the Push/Pull action upon a Workpiece.

Spiral-Segment—A segment of a spiral that achieves the Desired Effect with the preferred shape of the Spiral-Segment being defined in the Detailed Description of the Invention.

Pathway (PW)—A slot, slit, groove, track, wire, route, walls, bulkheads, guides, path or other similar purposed pathway used to guide an object along a predefined curvature that contributes to the Desired Effect. The PW can spiral left or right. The PW is not a constant radius arc.

Mirrored Pathway (MPW)—A mirror image of a Pathway used to Push/Pull an object along the Pathway. The MPW can spiral left or right but always spirals in the opposite direction as the PW. The Mirrored Pathway can be a segment or extension of the Pathway. And the Mirrored Pathway can deviate in shape from the Pathway so long as the Mirrored Pathway and Pathway work together to cause the Desired Effect at one or more relative angular positions.

Relative-Rotation—PW and MPW are on different surfaces. Relative-Rotation is where the PW and MPW surfaces rotate around their axis at different rates to create the Desired Effect. One surface can be stationary and have a rotation rate of zero. The axis can be misaligned as long as the Desired Effect is produced.

Desired Effect—Relative to using a circle segment (arc) per prior art (Longworth chuck): in terms of Engineering, an increase in the Push/Pull-Force derived from the force vector of the Mirrored Pathway being better aligned with the direction vector of the Pathway; in terms of Physics, a reduction is nonproductive forces such as friction, heat, noise or mechanical interference; in terms of machining, a more efficient use of locking force to hold a workpiece so the machining/forming process chatters less or is more accurate or has a better surface or can be machined faster or can be machined safer and/or other perceived or quality issues related to how well an object is held during the machining process.

BRIEF DESCRIPTION OF THE SEVERAL VIEWS OF THE DRAWING

FIG. 6, in one embodiment, provides a numerical table for scaling the preferred Pathway.

DETAILED DESCRIPTION OF THE INVENTION

The focus of this apparatus is on the inventive step—the curvature of the Pathway. The focus is not on the:

Locating-Pin (hard or soft pin, jaw, block, teeth, clamp, spacer, threaded element, motorized device, magnet, electromagnet, plasma, force-field, or other devices used to move, locate, and/or hold a Workpiece, Rotation-Bushing (pin, bearing, bushing, sleeve, threaded element, motor, axle, gear, spindle, interior or exterior wheels/pins, magnet, electromagnet, plasma, force-field or other devices used to align and/or rotate the rotating surface to the other surface that contain the PW or MPW), Optional Lock (lock, pin, threaded element, motor, magnet, electromagnet, plasma, force-field, or other devices used to hold the Workpiece), other features that allows an apparatus to perform in a specific application.

The design and incorporation of the Locating-Pin, Rotation-Busing, Optional Lock, and other features are up to a person versed in the art and desirous of a particular use. But it is hoped that those versed in this art will see the advantage of using a curvature that is not an arc and that delivers the Desired Effect.

Figure 1:
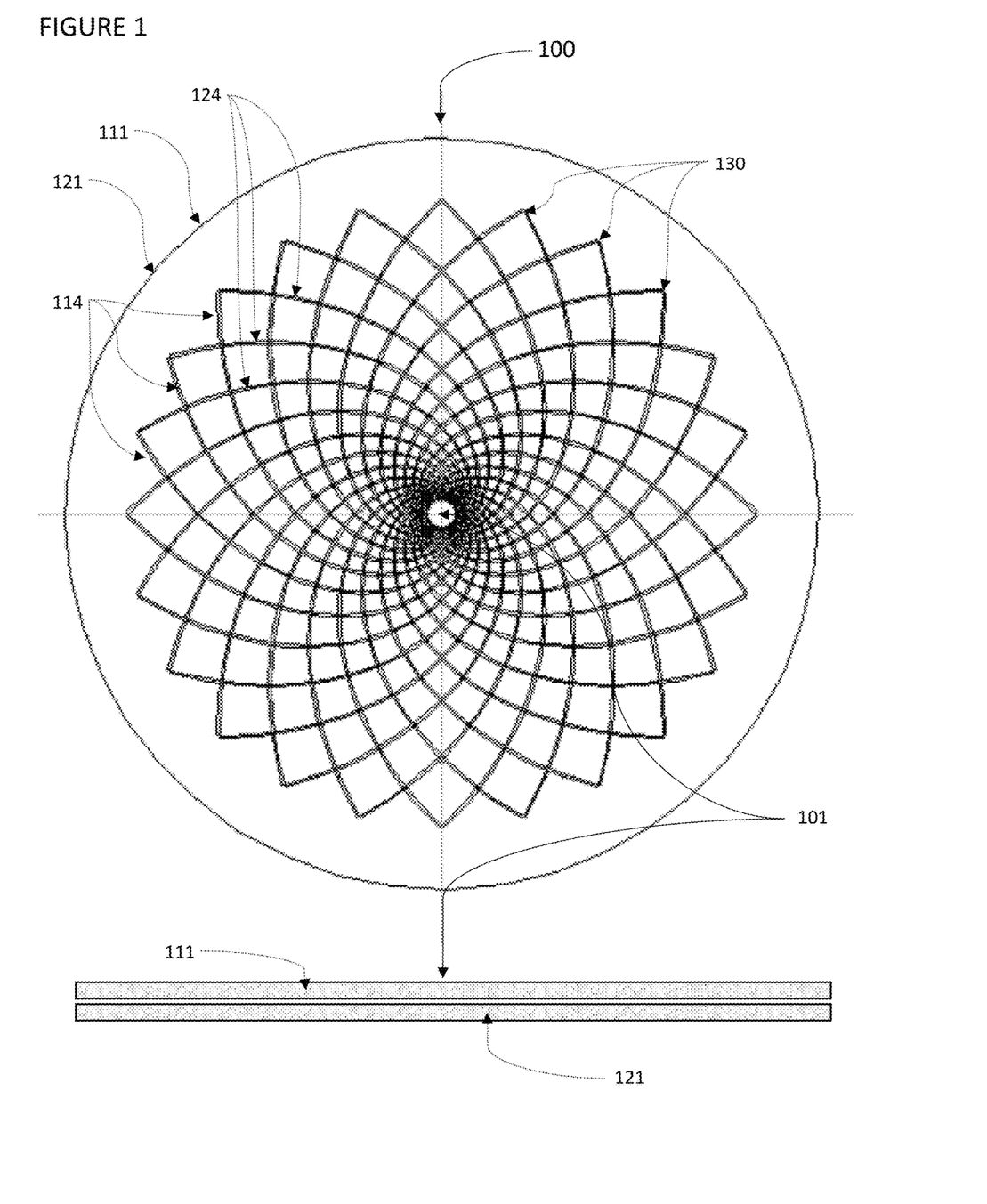
FIG. 1, in one embodiment, shows a top transparent view of preferred Pathway (PW) and Mirrored Pathway (MW) shapes on two approximately adjacent and aligned plates.

FIG. 1, in one embodiment, shows a twenty-four Leaf 130 apparatus called in some fields a Chuck 100 (the embodiment shows circular flat Plates 111/121 but the actual device need neither be flat nor circular as devised by someone skilled in the art). The Chuck 100 needs one (three if a perfect circular work-piece without additional locating method) or more Leaves 130. There is a limit to the number of Leaves 130 based on the fact that as Leaves 130 are added, the PW 124 or MPW 114 can weaken the Plates 111/121 or interfere with each other. Each Leaf 130 is composed of a PW 124 and MPW 114 with the PW 124 being a guide and the other MPW 114 doing the Push/Pull:

MPW 114 that are in the First Plate 111.
PW 124 that are in Second Plate 121.
Which together, if the plates are transparent, look like a Leaves 130.

Figure 2:
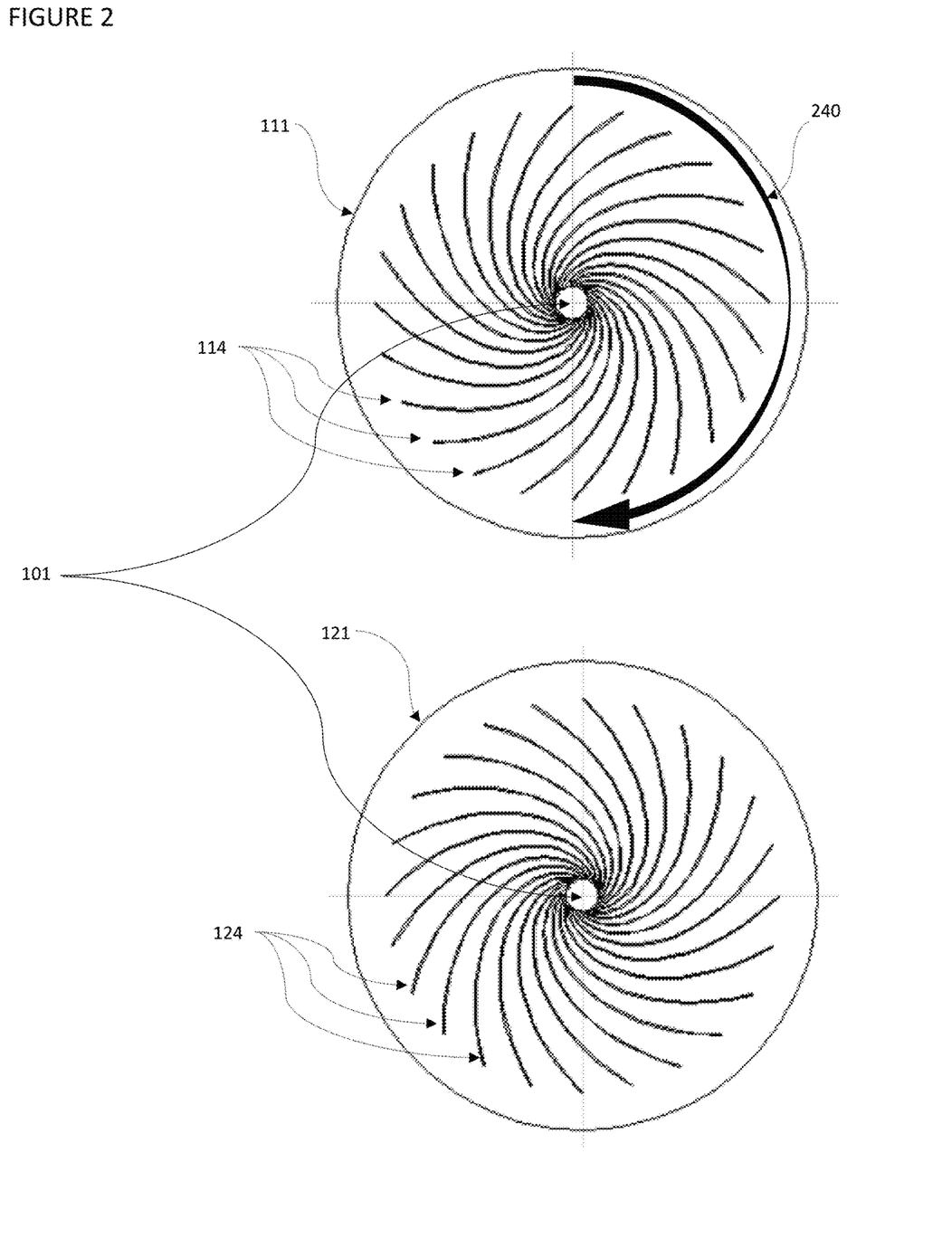
FIG. 2, in one embodiment, shows each plate individually.

FIG. 2, in one embodiment, shows twenty-four MPW 114 on Plate 111, twenty-four PW 124 on Plate 121, and an arrow 240 showing one possible Relative Rotation 240 around the Axis 101 of both Plates 111/121. This embodiment is not meant to imply that the Workpiece, not shown, be circular as a person experienced in the art knows how to make an interface to the Workpiece by using or creating tooling. It is customary to leave enough material around each PW 124 and MPW 114 to give adequate strength to the Plates 111/121 for holding the Workpiece when slots are employed as the means for guiding a Locating Pin. Both plates can have identical slots, but if so, one is flipped during assembly so that the PW 124 and MPW 114 point in the opposite direction (in that embodiment, flipping one plate creates mirror images of the slots).

Figure 3:
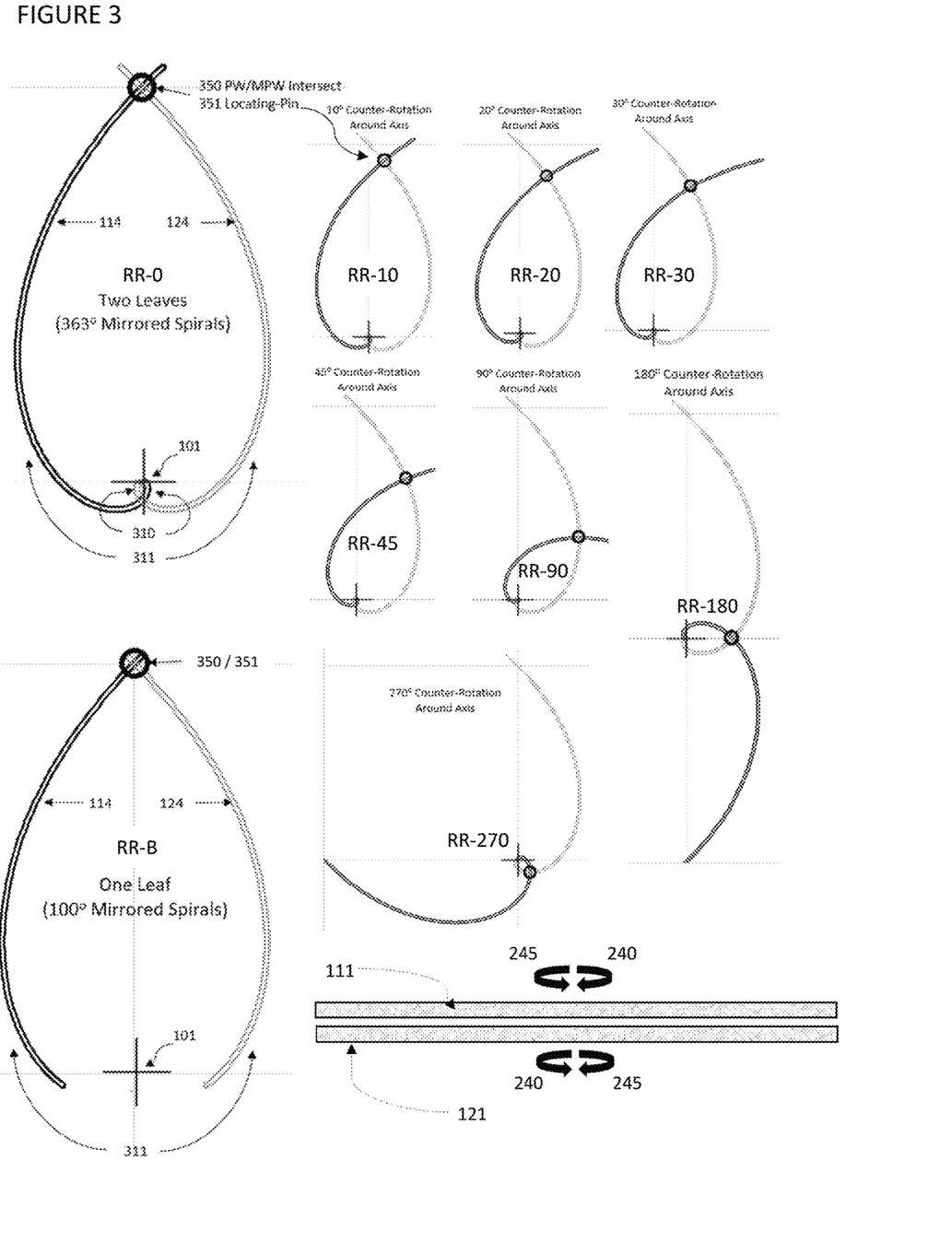
FIG. 3, in one embodiment, demonstrates how the MPW when rotated around its origin stays perpendicular to the preferred PW in the adjacent plate at their intersection.

FIG. 3, in one embodiment, shows how the Relative Rotational 240 of the First Plate 111 relative to the Second Plate 121 pushes a Locating-Pin 351 inward or shows how the Relative Rotational 245 of the First Plate 111 relative to the Second Plate 121 pushes a Locating-Pin 351 outward. In the embodiment where Plate 111 is placed directly on top of Plate 121 (with the Locating-Pins and Rotation-Bushing in place), and then Plate 111 is rotated in the direction of Relative Rotation 240 (or Plate 121 rotated in the direction of Relative Rotation 240), the Locating-Pin 351 (small circle) moves inward. Starting from when both halves of a Leaf 311 Intersect 350 at the outermost slot position (where overlap occurs) in drawing labeled RR-0, the Locating-Pin 351 is at its most outward or open position. In the embodiment labeled RR-10, rotating the First Plate 111 in the direction of the Relative Rotation 240, creates a relative movement of the First Plate 111 relative to the Second Plate 121 of 10 degrees, moves the Intersect 350 and Locating-Pin 351 from the outermost position to a 10-degree position. Then in the embodiment labeled RR-20, rotating farther another 10 degrees, moves a Locating-Pin 351 to the 20-degree position; repeating from embodiment labeled RR-30 to RR-45 to RR-90 to RR-180 to RR-270 until the Locating-Pin 351 at the slot Intersect 350 moves from the outermost position to an inner most position along the curvature of PW 124 being pushed by a nearly aligned forced caused by the nearly perpendicular Opposing MPW 114 at the Intersect 350 of the slots acting upon the Locating-Pin 351; the preferred embodiment showing a shape of the two opposing pathways PW 114 and MPW 124 being perpendicular over the entire travel of the Locating-Pin 351 to minimize force of movement, prevent binding, and finally provide even and greater holding forces. It should also be noted that upon each relative rotation that the shape of the Leaf 130 remained constant but its size kept getting smaller. Also shown are two sizes of pathways measured by degrees. The embodiment in drawing RR-0 shows two mirrored 363-degree spirals that creates a large leaf 311 and a small upside-down leaf 310 around the axis 101. The embodiment in drawing RR-B shows mirrored spirals that are composed of 100 degrees or part-spiral leaf around the axis 101.

Figure 4:
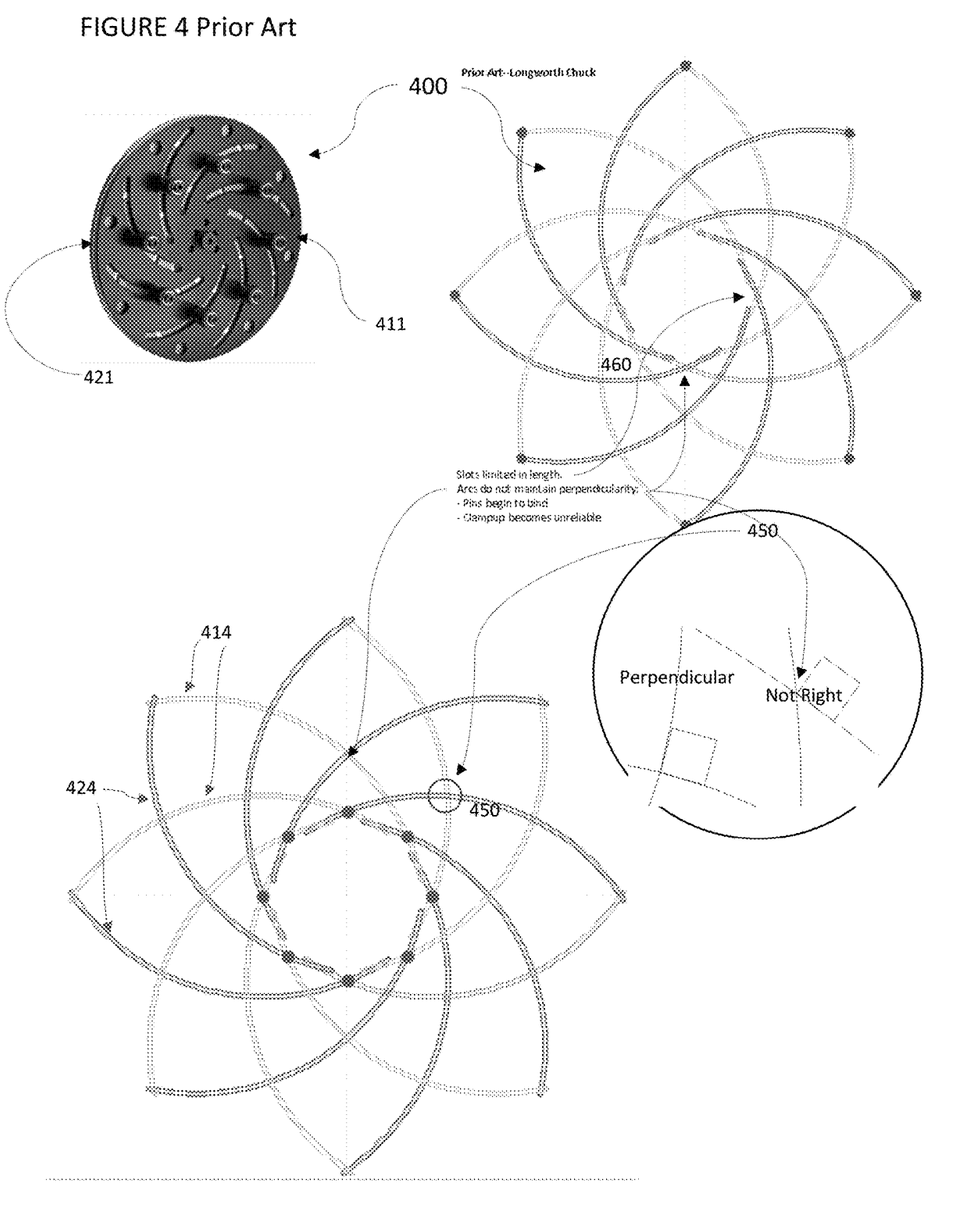
FIG. 4 visually shows how the curvature of prior art (Longworth chuck) can cause binding by becoming less and less perpendicular at the intersection as one plate is rotated around the other and shows that arcs on a single plate would intersect each other if extended too far limiting the length of the slotted arc.

FIG. 4 shows prior art—the Longworth Chuck 400 Plates 411 & 421 with Slot 424 and Mirrored Slot 414. Longworth Chuck slots are shaped from constant radius arcs, not spirals. The arcs are Limited-in-Length 460 because they can intersect other arcs if the slots were made too long (concentric spirals do not intersect). The slots for the Longworth chuck can only practically end at approximately ⅓$^{rd}$ the maximum radius of the slot in compression (e.g., a 14" maximum radius Longworth Chuck will have a 4.5" minimum before serious binding occurs or the plate is weakened). Also, the Slots 414/424 are only perpendicular to each other at one location. At the other locations, the arcs deviate more and more from perpendicular that results in less and less workpiece holding-force causing chatter. As shown in the blowup 450, if the arc are taken too far, the slots will cause binding. The result is less versatility, fewer applications, less holding force, lower RPMs and/or thinner cutter depths.

Figure 5:
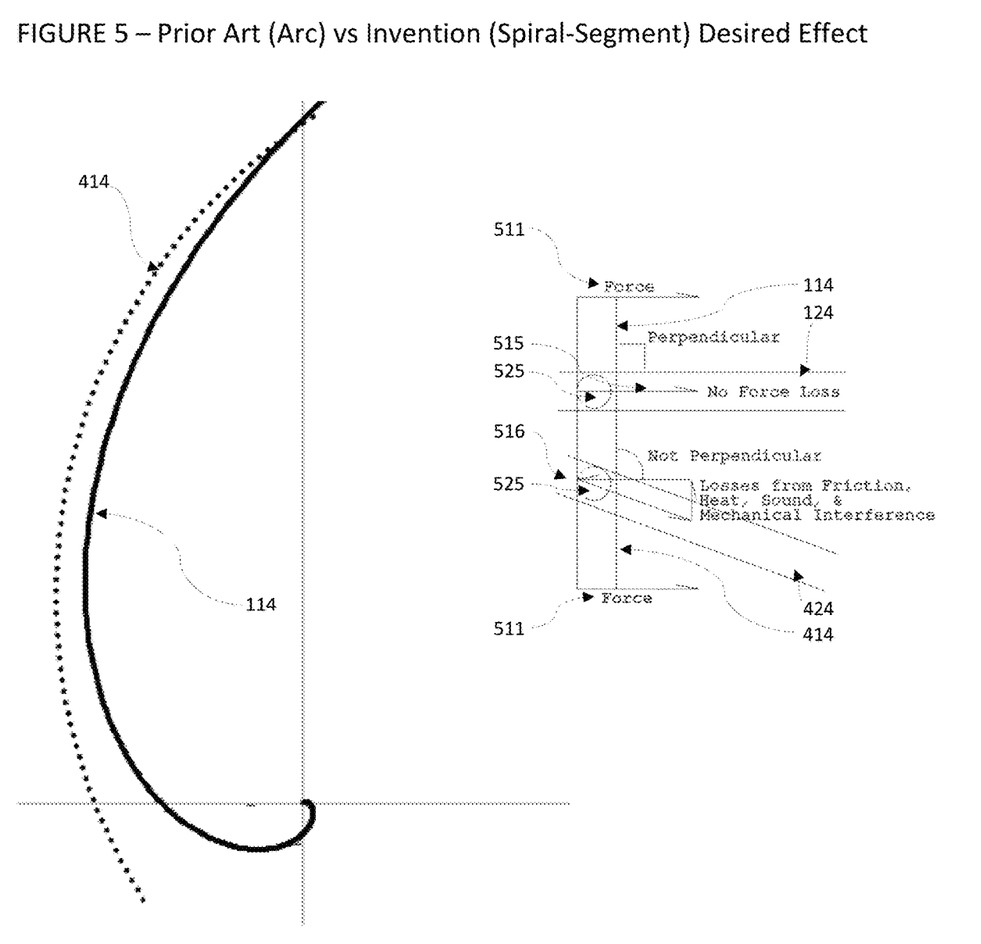
FIG. 5 compares the preferred Pathway shape of the invention to prior art (Longworth chuck).

FIG. 5 compares prior art 414, a constant radius Longworth arc, to one embodiment of the preferred spiral 114, showing the inventive step, and the result of that inventive step. Force 511 is created by the relative counterrotation of the MPW 114 that acts on a Locating-Pin 515 that then acts as forces 515/516 on a Workpiece. Spiral-segment 114 shows the inventive shape of a preferred PW that:
- Can handle a greater range of workpieces.
- Because the mirrored pathways are perpendicular,
  - Binding does not occur no matter how long the spiral-segment and
  - Clamp-up forces remain constant helping to decrease workpiece chatter.
- Approaches but never arrives at the origin point (0, 0).
- Is infinitely long as it continues to repeatedly curve around the origin/axis point.
- Continually decreases the radius of the curvature as it curves inward.
- Is Self-similar in that:
  - As the spiral is magnified it repeats itself and
  - It Is equiangular.
- The shape can be defined exactly or approximated by many equations.
- Mirrored curves rotated around the origin into each other:
  - Always Intersect at a 90-degree angle.
  - Form leaf shapes that are exactly proportional in shape to all other formed leaf shapes no matter the size.

There are many ways to express or estimate the equation for the preferred Spiral-Segment 124 that when mirrored and rotated about the origin/axis that the two Spiral-Segments are perpendicular or are nearly perpendicular. One such equation that expresses the preferred Spiral-Segment 124 is as follows:

$$x_n = \frac{y_{n-1} - s_n x_{n-1}}{\tan B_n - s_n}$$

$$y_n = x_n \tan B_n$$

$$s_n = \tan(w B_n + [1 - w] B_{n-1} + 45)$$

Where: $x_1, y_1$ can start from the scalable values (0, 1), the outer x and y coordinates
for angles in degrees $B_n$=90 to 90−b
b is an angle in degrees (e.g., 180),
w is a weight to approximate finite calculus where w=0.498546
Or in the mathematical form of a special-case logarithmic spiral:

$$x_n = r_n \times \cos(\propto_n + \beta)$$

$$y_n = r_n \times \sin(\propto_n + \beta)$$

$$r_n = c \times k^{\propto_n e^{(\ln(k))}}$$

Where: $\propto$ is an angle in radians from −∞ to ∞
$r_n$ is the radius of the spiral at $(x_n, y_n)$
n is an index to the points of the spiral for angles $\propto_n$
c is a constant to scale the spiral size
β is the angle of rotation of the entire spiral-segment (can be used in computer simulations to rotate a pathway)
k is a number >1
and in the special case where k=e (Euler's number 2.7183 . . . ), then $r = c \times e^{\propto}$
and when $\propto$ is used to scale the spiral, $r = e^{\propto}$
and mirrored images are created by reversing the sign of x or y.

FIG. 6, in one preferred embodiment, provides a table of scalable values to draw a Pathway shape. This table can be used to scale and approximate the Spiral-Segment shape when an equation, like presented above is not practical.

The invention claimed is:

1. An apparatus to hold an object in a lathe, comprising:
a first plate comprising a first-spiral Pathway, wherein:
   the first-spiral Pathway shape is a section of a hook-shaped curve that decreases in radius of curvature as the hook-shaped curve extends from an outer portion of the first plate to an inner portion of the first plate;
   the first-spiral Pathway is rotated at a first-angle Beta (β); and
   a location of the first-spiral Pathway hook-shaped curve is positioned around an Axis;
a second plate, layered on top of or below the first plate, comprising a second-spiral Pathway that intersects and mirrors the shape of the first-spiral Pathway, is located about the Axis, and is rotated at the first-angle Beta;
a Rotation-Bushing that configures the first plate to rotate relative to the second plate about the Axis;
a first Locating-Pin, wherein the first Locating-Pin moves along a route upon rotation of the first plate relative to the second plate where the first-spiral Pathway intersects the second-spiral Pathway and provides an opposing force to hold the object; and
a linkage between the first plate to a lathe or the second plate to the lathe where the lathe spins the apparatus around the Axis.

2. The apparatus of claim 1, wherein:
the first plate further comprises a third-spiral Pathway with the same shape as the first-spiral Pathway; is located about the Axis; and is rotated at a second-angle Beta;
the second plate further comprises a fourth-spiral Pathway that intersects and mirrors the shape of the third-spiral Pathway, is located about the Axis, and is rotated at the second-angle Beta; and
the apparatus further comprises a second Locating-Pin, wherein the second Locating-Pin moves where the third-spiral Pathway intersects the fourth-spiral Pathway and provides an opposing force to hold the object.

3. The apparatus of claim 2, wherein: the first Locating-Pin is configured to be positioned at a first user-defined location about the Axis; and
the second Locating-Pin is configured to be positioned at a second user-defined location about the Axis; and where the distance from the Axis to the first user-defined location and the distance from the Axis to the second user-defined location are the same.

4. The apparatus of claim 1, wherein a combined shape of the first-spiral Pathway and the second-spiral Pathway forms a leaf shape with continually decreasing radius of curvatures where the first-spiral Pathway is defined to be perpendicular to the second-spiral Pathway along the entire route of the first Locating-Pin.

5. The apparatus of claim 4, wherein:
the first plate further comprises a third-spiral Pathway with the same shape as the first-spiral Pathway; is located about the Axis; and is rotated at a second-angle Beta;
the second plate further comprises a fourth-spiral Pathway with the same shape as the second-spiral Pathway; is located about the Axis; and is rotated at the second-angle Beta; and
the apparatus further comprises a second Locating-Pin, wherein the second Locating-Pin moves where the third-spiral Pathway intersects the fourth-spiral Pathway and provides an opposing force to hold the object.

6. The apparatus of claim 5, wherein: the first Locating-Pin is configured to be positioned at a first user-defined location about the Axis; and the second Locating-Pin is configured to be positioned at a second user-defined location about the Axis; and where the distance from the Axis to the first user-defined location and the distance from the Axis to the second user-defined location are the same.

7. An apparatus to position or hold an object, comprising:
a first plate comprising a first-spiral Pathway, wherein:
   the first-spiral Pathway shape is a section of a hook-shaped curve that decreases in radius of curvature as the hook-shaped curve extends from an outer portion of the first plate to an inner portion of the first plate;
   the first-spiral Pathway is rotated at a first-angle Beta (β); and
   the first-spiral Pathway is located to position or hold the object;
a second plate, layered on top of or below the first plate, comprising a second-spiral Pathway that is located and rotated to intersect the first-spiral Pathway and to position or hold the object;
a Rotation-Bushing that configures the first plate to rotate relative to the second plate about an Axis; and
a first Locating-Pin, wherein the first Locating-Pin moves along a route upon rotation of the first plate relative to the second plate where the first-spiral Pathway intersects the second-spiral Pathway and provides an opposing force to position or hold the object.

8. The apparatus of claim 7, wherein:
a first plate further comprises a third-spiral Pathway, wherein:
   the third-spiral Pathway shape is a section of a hook-shaped curve that decreases in radius of curvature as the hook-shaped curve extends from an outer portion of the first plate to an inner portion of the first plate;
   the third-spiral Pathway is rotated at a second-angle Beta; and
   the third-spiral Pathway is located to position or hold the object;
a second plate further comprises a fourth-spiral Pathway that is located and rotated to intersect the third-spiral Pathway and to position or hold the object; and
the apparatus further comprises a second Locating-Pin, wherein the second Locating-Pin moves where the third-spiral Pathway intersects the fourth-spiral Pathway and provides an opposing force to position or hold the object.

9. The apparatus of claim 8, wherein: the first Locating-Pin is configured to be positioned at a first user-defined location about the Axis; and the second Locating-Pin is configured to be positioned at a second user-defined location about the Axis.

10. The apparatus of claim 7, wherein a combined shape of the first-spiral Pathway and the second-spiral Pathway form a leaf shape where the first-spiral Pathway is defined to be perpendicular to the second-spiral Pathway along the entire route of the first Locating-Pin.

11. The apparatus of claim 10, wherein:
   the first plate further comprises a third-spiral Pathway located and rotated to position or hold the object;
   the second plate further comprises a fourth-spiral Pathway that is located and rotated to intersect the third-spiral Pathway and to position or hold the object; and
   the apparatus further comprises a second Locating-Pin, wherein the second Locating-Pin moves where the third-spiral Pathway intersects the fourth-spiral Pathway and provides an opposing force to position or hold the object.

12. The apparatus of claim 11, wherein: the first Locating-Pin is configured to be positioned at a first user-defined location about the Axis; and the second Locating-Pin is configured to be positioned at a second user-defined location about the Axis.

* * * * *